(12) United States Patent
Kim (10) Patent No.: US 11,312,412 B2
(45) Date of Patent: Apr. 26, 2022

(54) ELECTRIC-ASSISTED POWER STEERING APPARATUS

(71) Applicant: MANDO CORPORATION, Gyeonggi-do (KR)

(72) Inventor: Tae Sik Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 287 days.

(21) Appl. No.: 16/690,073

(22) Filed: Nov. 20, 2019

(65) Prior Publication Data

US 2020/0164915 A1 May 28, 2020

(30) Foreign Application Priority Data

Nov. 23, 2018 (KR) .......................... 10-2018-0146557

(51) Int. Cl.
*B62D 5/04* (2006.01)
*B62D 3/04* (2006.01)

(52) U.S. Cl.
CPC ............ *B62D 5/0484* (2013.01); *B62D 3/04* (2013.01); *B62D 5/0424* (2013.01); *B62D 5/0487* (2013.01)

(58) Field of Classification Search
CPC .. B62D 5/0472; B62D 5/0463; B62D 5/0481; B62D 5/0484; B62D 5/0487; B62D 3/04
See application file for complete search history.

(56) References Cited

U.S. PATENT DOCUMENTS

| | | | | |
|---|---|---|---|---|
| 2004/0007416 A1* | 1/2004 | Furumi | ................ | B62D 5/0409 180/443 |
| 2008/0184838 A1* | 8/2008 | Hayashi | ................. | B62D 5/008 74/484 R |
| 2013/0199865 A1* | 8/2013 | Park | ....................... | B62D 5/065 180/422 |
| 2014/0045634 A1* | 2/2014 | Hong | ..................... | B62D 5/008 475/4 |
| 2015/0291208 A1* | 10/2015 | Miyasaka | ............ | B62D 5/0484 701/41 |
| 2016/0280254 A1* | 9/2016 | Shimizu | ................ | B62D 5/0463 |
| 2017/0361869 A1* | 12/2017 | Hales | ................... | B62D 5/0463 |
| 2018/0100567 A1* | 4/2018 | Kim | ........................ | F16H 57/12 |
| 2019/0002015 A1* | 1/2019 | Hwang | .................... | B62D 3/12 |
| 2019/0367076 A1* | 12/2019 | Kim | ..................... | B62D 5/0406 |

* cited by examiner

*Primary Examiner* — Tony H Winner
(74) *Attorney, Agent, or Firm* — Ladas & Parry, LLP (57) ABSTRACT

Provided is an electric assisted power steering apparatus having a structure able to disconnect a worm shaft from any malfunctioning motor of motors connected to opposite end portions of the worm shaft, thereby preventing the worm shaft from rotating heavily or failing to rotate. Even in the case in which the worm shaft is disconnected from the malfunctioning motor, a target rotation speed of the properly-operating motor is increased to prevent sudden changes in auxiliary torque occurring on a steering shaft, thereby promoting the safety of a driver. Torque required for the worm shaft is distributed to the two motors, thereby increasing the rotation speeds of the motors and reducing the size and fabrication costs of the motors.

16 Claims, 10 Drawing Sheets

ELECTRIC-ASSISTED POWER STEERING APPARATUS

CROSS REFERENCE TO RELATED APPLICATION

This application claims priority from Korean Patent Application No. 10-2018-0146557, filed on Nov. 23, 2018, which is hereby incorporated by reference for all purposes as if fully set forth herein.

BACKGROUND

Field

Embodiments relate to an electric assisted power steering apparatus and, more particularly, to an electric assisted power steering apparatus having a structure able to disconnect a worm shaft from any malfunctioning motor of motors connected to opposite end portions of the worm shaft, thereby preventing the worm shaft from rotating heavily or failing to rotate. Even in the case in which the worm shaft is disconnected from the malfunctioning motor, a target rotation speed of the properly-operating motor can be increased to prevent sudden changes in auxiliary torque occurring on a steering shaft, thereby promoting the safety of a driver. Torque required for the worm shaft can be distributed to the two motors, thereby increasing the rotation speeds of the motors and reducing the size and fabrication costs of the motors.

DESCRIPTION OF RELATED ART

In an electric power steering apparatus, an electronic control unit (ECU) generally operates a driving system to assist in the steering of a driver in accordance with operating conditions of a vehicle detected by a vehicle speed sensor, a steering torque sensor, and the like.

Such a driving system includes a worm wheel coupled to a steering shaft, a worm shaft engaged with the worm wheel, and a motor connected to the worm shaft. A reducer structure, comprised of the worm wheel and the worm shaft, amplifies the torque of the motor, and provides assistance torque to the steering shaft.

However, in a case in which the motor does not operate properly due to a mechanical failure, such as contact between a rotor and a stator within a motor, or an electrical failure, such as overloading, a short circuit, or malfunctioning in a sensor, an intended amount of assistance torque cannot be obtained.

In particular, in a steer-by-wire (SbW) steering apparatus for steering a vehicle using electrical power without a mechanical connection between a steering wheel and a front wheel steering device, vehicle steering may be impossible when the motor malfunctions.

To solve such a problem, motors may be provided on opposite end portions of a worm shaft, such that, even when one of the motors fails to operate properly, the other motor can operate properly to generate assistance torque. However, in the electric power steering apparatus of the related art, the motor shaft of the malfunctioning motor may not be disconnected from the worm shaft. This may cause the rotation of the worm shaft to be heavier to reduce assistance torque or may prevent the rotation of the worm shaft so that assistance torque cannot be generated.

BRIEF SUMMARY

Various aspects provide an electric assisted power steering apparatus having a structure able to disconnect a worm shaft from any malfunctioning motor of motors connected to opposite end portions of the worm shaft, thereby preventing the worm shaft from rotating heavily or failing to rotate. Even in the case in which the worm shaft is disconnected from the malfunctioning motor, a target rotation speed of the properly-operating motor can be increased to prevent sudden changes in auxiliary torque occurring on a steering shaft, thereby promoting the safety of a driver. Torque required for the worm shaft can be distributed to the two motors, thereby increasing the rotation speeds of the motors and reducing the size and fabrication costs of the motors.

According to an aspect, an electric assisted power steering apparatus may include: a worm shaft engaging with a worm wheel; connecting members respectively including a connecting shaft and an actuator actuating the connecting shaft, wherein the connecting shafts of the connecting members are provided on opposite end portions of the worm shaft, one of the connecting shafts connects one end portion of the worm shaft and a motor shaft of a first motor, and the other connecting shaft connects the other end portion of the worm shaft and a motor shaft of a second motor; and a controller receiving information regarding motor rotation speeds from sensors detecting a rotation speed of the first motor and a rotation speed of the second motor, if a rotation speed of one motor of the first and second motors is different from a predetermined target rotation speed, determines the corresponding motor as malfunctioning, and controls the corresponding actuator to move the corresponding connecting shaft, thereby disconnecting the worm shaft from the malfunctioning motor.

According to exemplary embodiments, the worm shaft can be disconnected from any malfunctioning motor of motors connected to opposite end portions of the worm shaft, thereby preventing the worm shaft from rotating heavily or failing to rotate. Even in the case in which the worm shaft is disconnected from the malfunctioning motor, a target rotation speed of the properly-operating motor can be increased to prevent sudden changes in auxiliary torque occurring on the steering shaft, thereby promoting the safety of a driver. Torque required for the worm shaft can be distributed to the two motors, thereby increasing the rotation speeds of the motors and reducing the size and fabrication costs of the motors.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

An electric power steering apparatus 200 according to embodiments includes a worm shaft 113, connecting members 121, and a controller 201. The worm shaft 113 is engaged with a worm wheel 111. The connecting members 121 respectively include a connecting shaft 123 and an actuator 125 actuating the connecting shaft 123. The connecting shafts 123 of the connecting members 121 are provided on opposite end portions of the worm shaft 113. One of the connecting shafts 123 connects one end portion of the worm shaft 113 and a motor shaft 105 of a first motor 101, while the other connecting shaft 123 connects the other end portion of the worm shaft 113 and a motor shaft 107 of a second motor 103. The controller 201 receives information regarding motor rotation speeds from sensors 203 detecting the rotation speed of the first motor 101 and the rotation speed of the second motor 103, if the rotation speed of one motor of the first motor 101 and the second motor 103 is different from a predetermined target rotation speed, determines the corresponding motor as malfunctioning, and controls the corresponding actuator 125 to move the corresponding connecting shaft 123, thereby disconnecting the worm shaft 113 from the malfunctioning motor.

Figure 1:
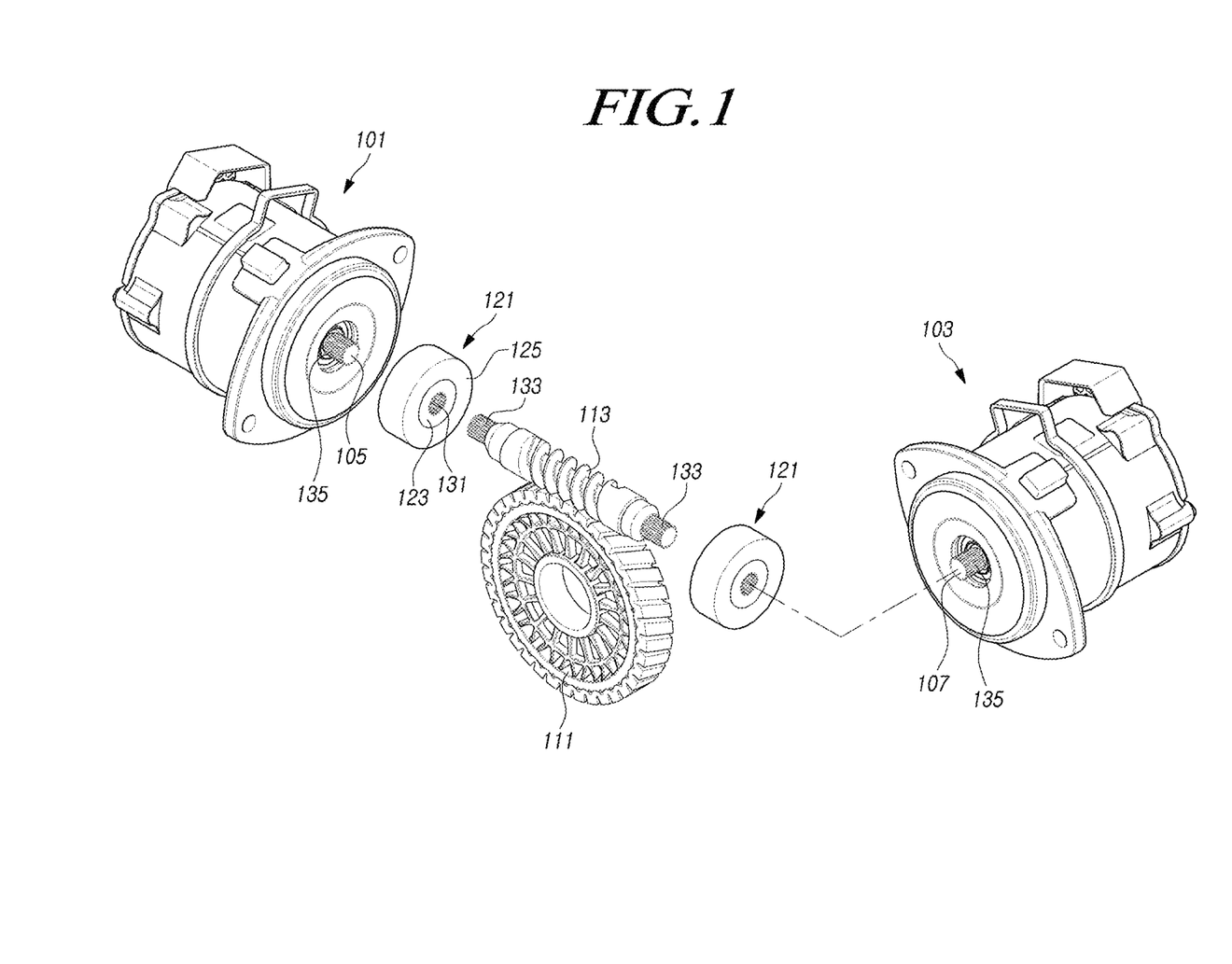
FIG. 1 is an exploded perspective view illustrating an electric assisted power steering apparatus according to embodiments.
Figure 2:
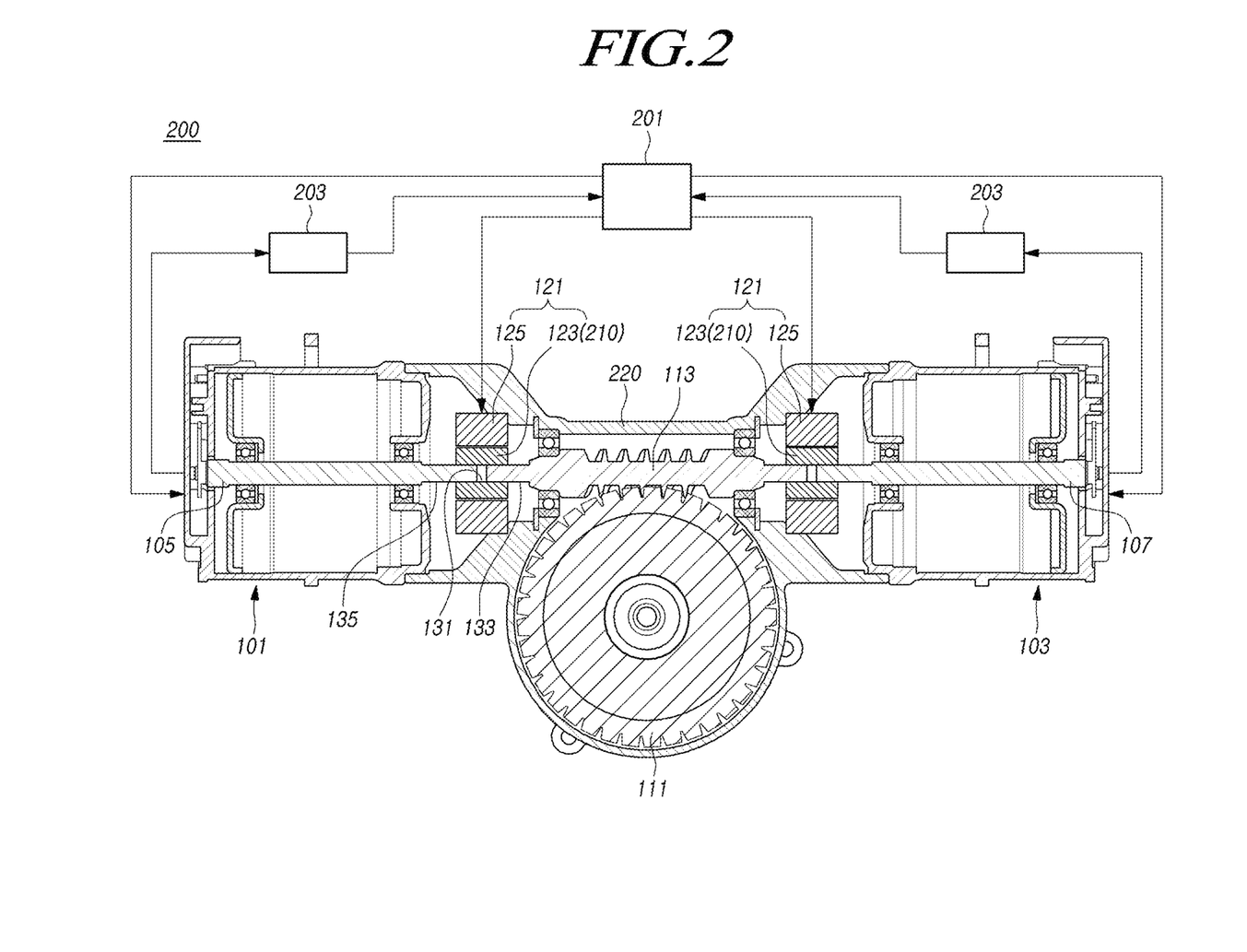
FIG. 2 is a cross-sectional view illustrating the electric assisted power steering apparatus according to embodiments.

First, a description will be given with reference to FIGS. 1 and 2.

The worm shaft 113 is engaged with the worm wheel 111 coupled to a steering shaft (not shown). Torque that the first motor 101 and the second motor 103 apply to the worm shaft 113 is transmitted to the steering shaft while being reduced, thereby assisting in steering torque of a driver.

The first motor 101 and the second motor 103 are connected to the worm shaft 113 via the connecting members 121. The connecting members 121 respectively include the connecting shaft 123 and the actuator 125 driving the connecting shaft 123. The connecting shafts 123 are provided on opposite end portions of the worm shaft 113 to connect one end portion of the worm shaft 113 to the motor shaft 105 and the other end portion of the worm shaft 113 to the motor shaft 107.

That is, the first motor 101 is connected to one end portion of the worm shaft 113, while the second motor 103 is connected to the other end portion of the worm shaft 113. The connecting members 121 are provided as two connecting members 121, one of which connects the motor shaft 105 of the first motor 101 to one end portion of the worm shaft 113, and the other of which connects the motor shaft 107 of the second motor 103 to the other end portion of the worm shaft 113.

The connecting shafts 123 of the connecting members 121 have a hollow structure, which will be described later, and connect the worm shaft 113 to the first motor 101 and the worm shaft 113 to the second motor 103.

Accordingly, comparing to a related-art electric power steering apparatus including only a single motor, torque required for the worm shaft 113 is distributed to the first motor 101 and the second motor 103, and thus, the rotation speeds of the motors may be increased. In addition, it is possible to reduce the maximum output of the motors, thereby advantageously reducing the size and fabrication costs of the motors.

The first motor 101 and the second motor 103 are controlled by the controller 201 to provide assistance torque to the steering shaft. The controller 201 receives information from a torque sensor (not shown), a vehicle speed sensor (not shown), and the like, and on the basis of the received information, predetermines a target rotation speed of the first motor 101 and the second motor 103.

A motor may not operate properly due to a mechanical failure, an electrical failure, or the like. As examples of the mechanical failure, the rotor of the motor may come into contact with the state, thereby generating friction, or the rotor may interfere with the stator so as to be unable to rotate. Examples of the electrical failure may include overloading, short circuits caused by overheating, malfunctioning in a sensor.

The controller 201 receives information regarding the motor rotation speeds from the sensors 203 detecting the rotation speed of the first motor 101 and the rotation speed of the second motor 103. If the rotation speed of one of the first motor 101 and the second motor 103 is different from the predetermined target rotation speed, the controller 201 determines that the corresponding motor malfunctions.

It should be understood that the rotation speed of the motor being different from the target rotation speed not only means a case in which the rotation speeds are not accurately identical but also the difference between the rotation speed of the motor and the target rotation speed deviates from a predetermined range. Such a range may be determined in consideration of vehicle types or the like.

Here, in a case in which the worm shaft 113 rotates together the shaft of the malfunctioning motor while being connected to the malfunctioning motor, the other properly-operating motor rotates the worm shaft 113. In this case, the rotation of the worm shaft 113 may become heavier or the worm shaft 113 may not rotate due to a mechanical failure, which is problematic. To prevent such a problem, it is necessary to disconnect the worm shaft 113 from the malfunctioning motor.

That is, in the electric power steering apparatus 200 according to embodiments, the controller 201 controls the actuators 125 to move the connecting shafts 123, thereby disconnecting the worm shaft 113 from the malfunctioning motor. This prevents the problems in that the rotation of the worm shaft 113 becomes heavier by the malfunctioning motor and the rotation of the worm shaft 113 is stopped.

Accordingly, the worm shaft 113 is only rotated by the properly-operating motor to provide assistance torque to the steering shaft. Even when one of the first motor 101 and the second motor 103 malfunctions, a driver's manipulation of the steering wheel may be assisted without degradation in the feeling of steering of the driver.

In other words, in a case in which the first motor 101 malfunctions and the second motor 103 operates properly, the controller 201 controls the actuators 125 to disconnect the motor shaft 105 of the first motor 101 from one end portion of the worm shaft 113, so that the worm shaft 113 is rotated by the second motor 103. In a case in which first motor 101 operates properly and the second motor 103 malfunctions, the controller 201 controls the actuators 125 to disconnect the other end portion of the worm shaft 113 from the motor shaft 107 of the second motor 103, so that the worm shaft 113 is rotated by the first motor 101.

In addition, in a case in which the worm shaft 113 is disconnected from one motor of the first motor 101 and the second motor 103, the controller 201 may increase the target rotation speed of the other motor of the first motor 101 and the second motor 103.

That is, when the worm shaft 113 is disconnected from the malfunctioning motor, the target rotation speed of the properly-operating motor may be increased by, for example, applying a greater amount of current to the properly-operating motor. In this manner, a sudden change in assistance torque occurring on the steering shaft may be prevented, thereby promoting the safety of the driver.

In addition, both the first motor 101 and the second motor 103 may malfunction. In this case, the worm shaft 113 may be disconnected from both the first motor 101 and the second motor 103.

In addition, the controller 201 may stop the supply of power to the vehicle, and the driver may drive the vehicle to a safe place using the remaining power of the vehicle.

In addition, the controller 201 may report the abnormality of the vehicle to the driver before stopping the supply of power to the vehicle, so that the driver may recognize the abnormality of the vehicle.

Figure 4:
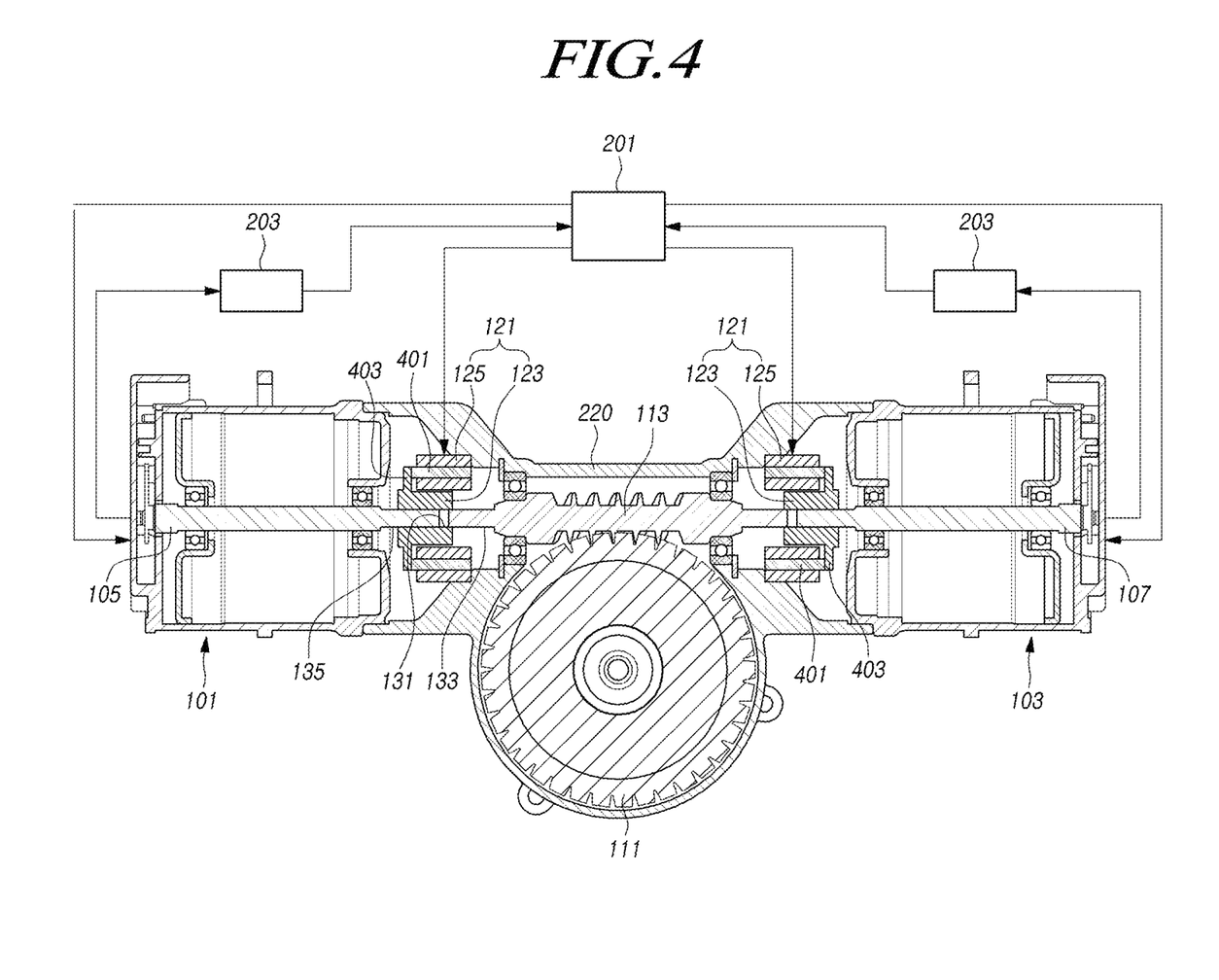
FIG. 4 is a cross-sectional view illustrating an electric assisted power steering apparatus according to embodiments.

In addition, the actuators 125 include rods 210 or 401 for driving the connecting shafts 123. As illustrated in FIG. 2, each of the rods 210 may be provided integrally with the corresponding connecting shaft 123. As illustrated in FIG. 4, the rods 401 may be provided separately from the connecting shafts 123 to be supported axially on the corresponding connecting shafts 123.

Figure 3:
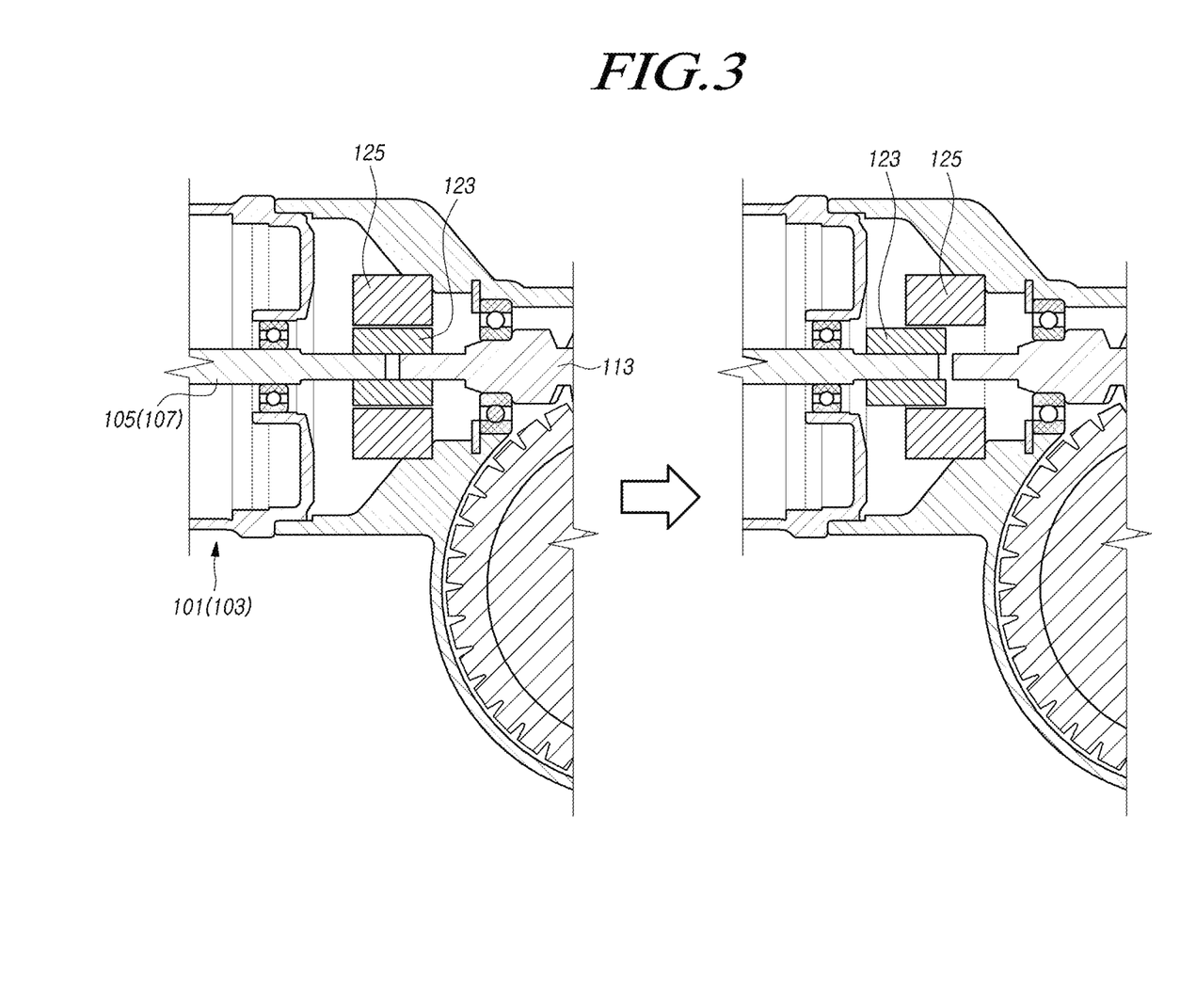
FIG. 3 is a cross-sectional view illustrating the operating state of portions of the electric assisted power steering apparatus illustrated in FIG. 2.
Figure 5:
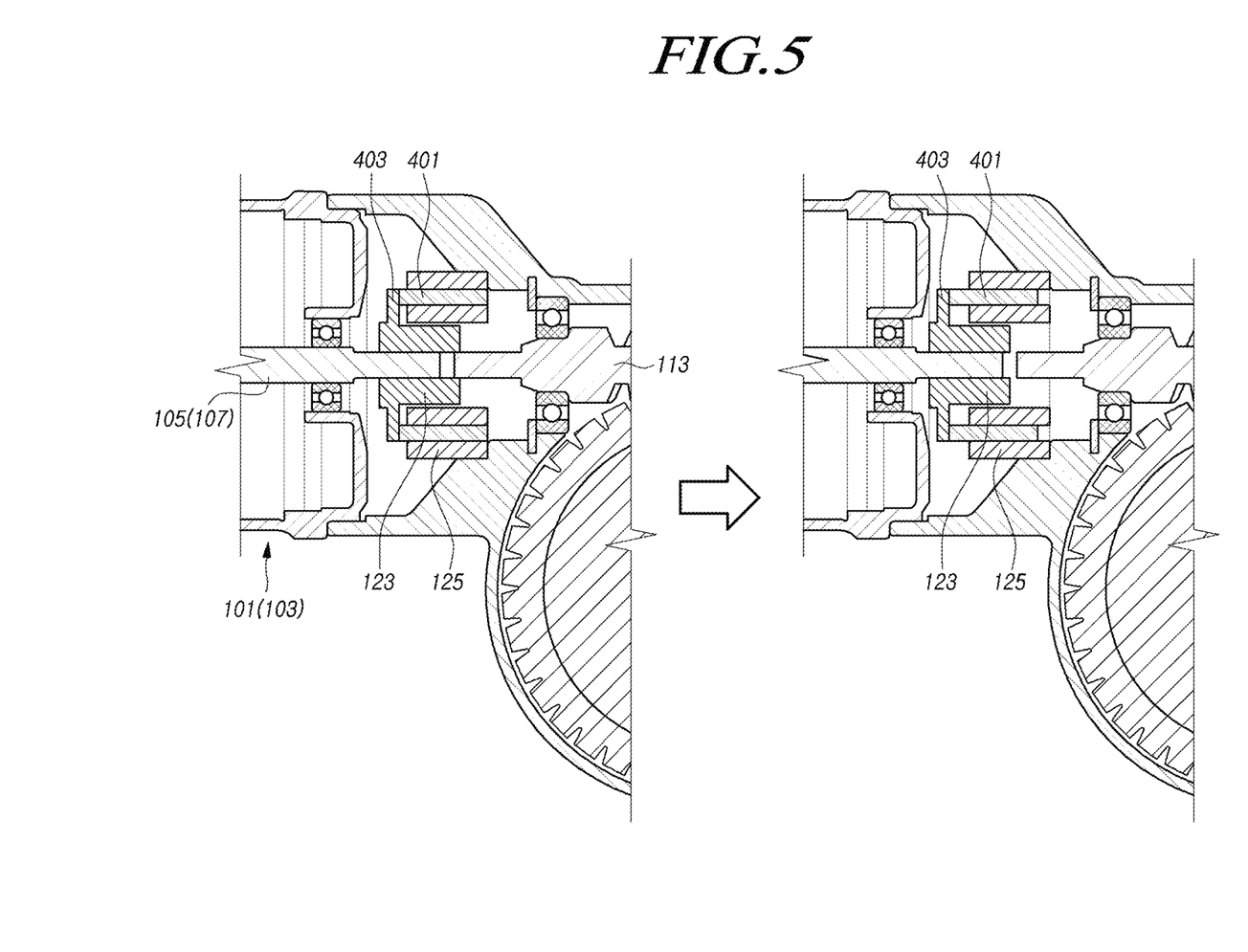
FIG. 5 is a cross-sectional view illustrating the operating state of portions of the electric assisted power steering apparatus illustrated in FIG. 4.

That is, referring to FIGS. 3 and 5, as the actuators 125 move the rods 210 and 402 forwardly in the axial direction, the connecting shafts 123 move in the axial direction, so that the worm shaft 113 is disconnected from the malfunctioning motor.

The rods 210 provided integrally with the connecting shafts 123 rotate together with the motor shafts and the worm shaft 113, whereas the connecting shafts 123 provided separately from the connecting shafts 123 do not rotate together with motor shafts and the worm shaft 113.

The actuators 125 may be implemented using, for example, solenoids. That is, shafts of the solenoids may be the rods 210 or 401, which are provided integrally with the connecting shafts 123 or supported axially on the connecting shafts 123.

In a case in which each of the rods 210 is provided integrally with the corresponding connecting shaft 123, the rods 210 (connecting shafts 123) may slide axially in response to the operation of the actuators 125, so that the worm shaft 113 is disconnected from the malfunctioning motor.

In a case in which the rods 401 are provided separately from the connecting shafts 123 to be supported on the connecting shafts 123, the rods 401 move forwardly in response to the operation of the actuators 125, thereby causing the connecting shafts 123 to slide axially, so that the worm shaft 113 is disconnected from the malfunctioning motor.

Here, a portion of the connecting shaft 123 protrudes axially from the actuator 125. The protruding portion of the connecting shaft 123 has a support 403 extending radially to be supported on the corresponding rod 401. The rod 401 pushes the support 403 axially, and the connecting shaft 123 is slid axially.

Two or more supports 403 may be provided, and two or more rods 401 corresponding to the two or more supports 403 may be provided.

The supports 403 may be provided in symmetrical positions on the outer circumferential surfaces of the connecting shafts 123, such that the connecting shafts 123 may slide smoothly when the rods 401 are slid forwardly.

In other words, in a case in which a single support 403 is provided, the connecting shaft 123 may not slide properly, since torque may be generated when the connecting shaft 123 slides in response to the forward movement of the rod 401. As the two or more supports 403 are provided symmetrically and the supports 403 are supported on the rods 401, torque may be canceled, and the connecting shafts 123 may slide properly.

In addition, as described above, the connecting shaft 123 has a hollow structure to connect the worm shaft 113 and the motor shaft.

That is, one end portion of the worm shaft 113 and the motor shaft 105 of the first motor 101 are fitted into the connecting shaft 123 such that one end portion of the worm shaft 113 and the motor shaft 105 face each other. The other end portion of the worm shaft 113 and the motor shaft 107 of the second motor 103 are fitted into the connecting shaft 123 such that the other end portion of the worm shaft 113 and the motor shaft 107 face each other. The worm shaft 113 is connected to the first motor 101 and the second motor 103.

In addition, first serrations 131 may be provided on the inner circumferential surfaces of the connecting shafts 123, respectively, second serrations 133 engaging with the first serrations 131 may be provided on the opposite end portions of the worm shaft 113, and third serrations 135 engaging with the first serrations 131 may be provided on the motor shafts 105 and 107 of the first motor 101 and the second motor 103, such that torque of the first motor 101 and the second motor 103 is transmitted to the worm shaft 113.

When the motor shafts 105 and 107 and the opposite end portions of the worm shaft 113 are inserted into the connecting shafts 123, the first serrations 131 engage with the second serrations 133, and the first serrations 131 engage with the third serrations 135. The worm shaft 113, the motor shafts 105 and 107, and the connecting shafts 123 are fixed in the circumferential direction, such that torque of the first motor 101 and the second motor 103 may be transmitted to the worm shaft 113.

In addition, as described above, the rods 210 or 401 of the actuators 125 slide the connecting shafts 123 in the axial direction while moving forwardly. Due to the serrations, the connecting shafts 123 may be slid axially by the actuators 125 to be dislodged from the outer circumferential surfaces of the motor shafts 105 and 107 or the worm shaft 113, thereby disconnecting the worm shaft 113 from the motor shafts 105 and 107.

Here, if one of the first motor 101 and the second motor 103 malfunctions, the actuators 125 may slide the connecting shafts 123 on the worm shaft 113 toward the malfunctioning motor, so that the connecting shaft 123 is disconnected from the worm shaft 113.

In other words, if the actuator 125 slides the connecting shaft 123 from the malfunctioning motor toward the worm shaft 113 so that the connecting shaft 123 is dislodged from the motor shaft of the malfunctioning motor, the connecting shaft 123 may rotate together with the worm shaft 113, so that the rotation of the worm shaft 113 becomes relatively heavier, thereby degrading the feeling of steering of the driver.

Thus, the connecting shaft 123 is dislodged from the worm shaft 113 and is supported on the motor shaft of the malfunctioning motor. The connecting shaft 123 is not rotated while the worm shaft 113 is being rotated by the properly-operating motor. Accordingly, degradation in the feeling of steering of the driver may be prevented.

In a case in which the rod 210 of the actuator 125 is provided integrally with the connecting shaft 123, the actuator 125 may move the rod 210 on the worm shaft 113 toward the malfunctioning motor. In a case in which the rod 401 of the actuator 125 is provided separately from the connecting shaft 123, the rod 401 may be moved forwardly on the worm shaft 113 while being supported on the support 403. Accordingly, when the worm shaft 113 is operated by the controller 201, the connecting shaft 123 may be dislodged from the worm shaft 113.

As illustrated in the drawings, the actuator 125 may be coupled to a housing 220 in which the worm shaft 113 and the worm wheel 111 are accommodated, so that the connecting shaft 123 slides on the worm shaft 113 toward the malfunctioning motor.

In addition, a damping member may be provided inside of the connecting shaft 123 to reduce noise when the connecting shaft 123 rotates together with the motor shaft 105 or 107 and the worm shaft 113.

Figure 6:
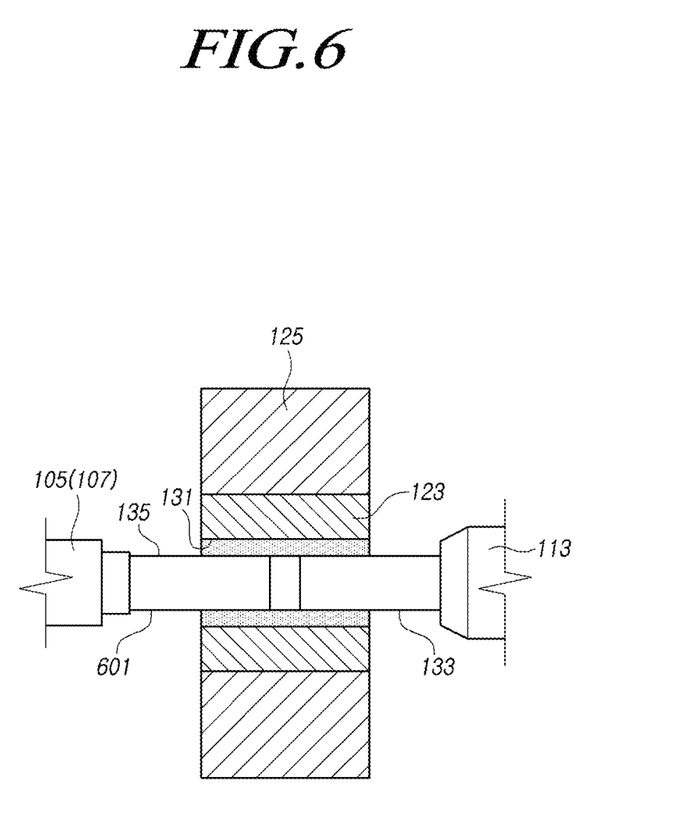
FIGS. 6 to 10 are cross-sectional views illustrating portions of the electric assisted power steering apparatus according to embodiments.
Figure 7:
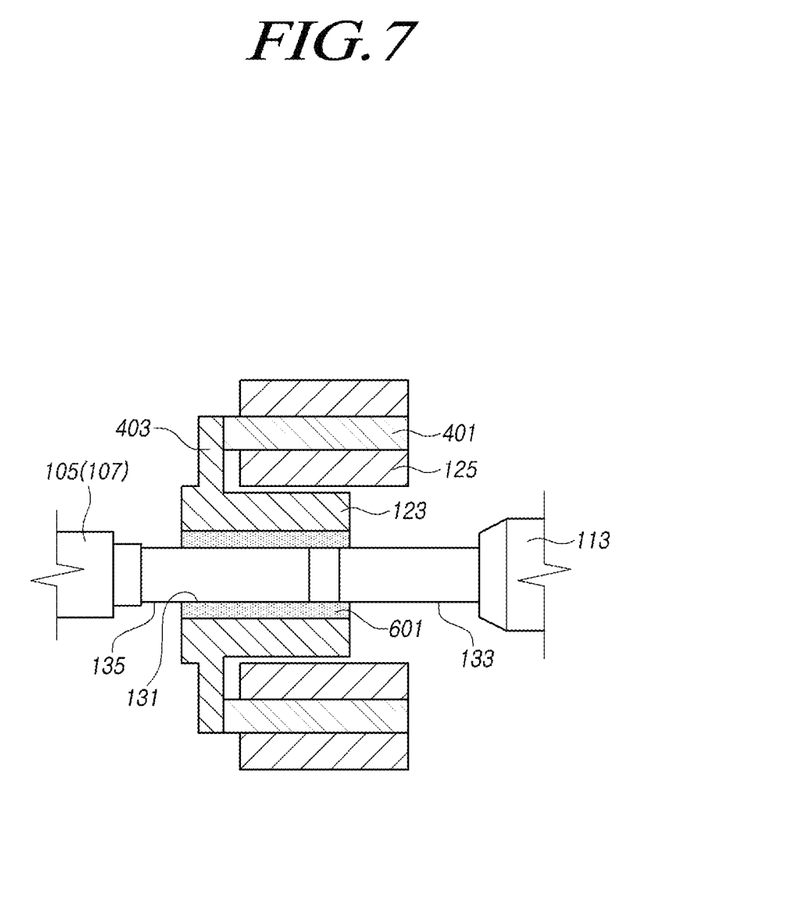

First, referring to FIGS. 6 and 7, a damping member 601 may be provided in the connecting shaft 123, extending from one end to the other end in the axial direction. The first serration 131 may be provided on the inner circumferential surface of the damping member 601.

Accordingly, one end of the worm shaft 113 and the motor shaft 105 or 107 are into the damping member 601. The damping member 601 is engaged with the first serration 131, the second serration 133, and the third serration 135.

Figure 8:
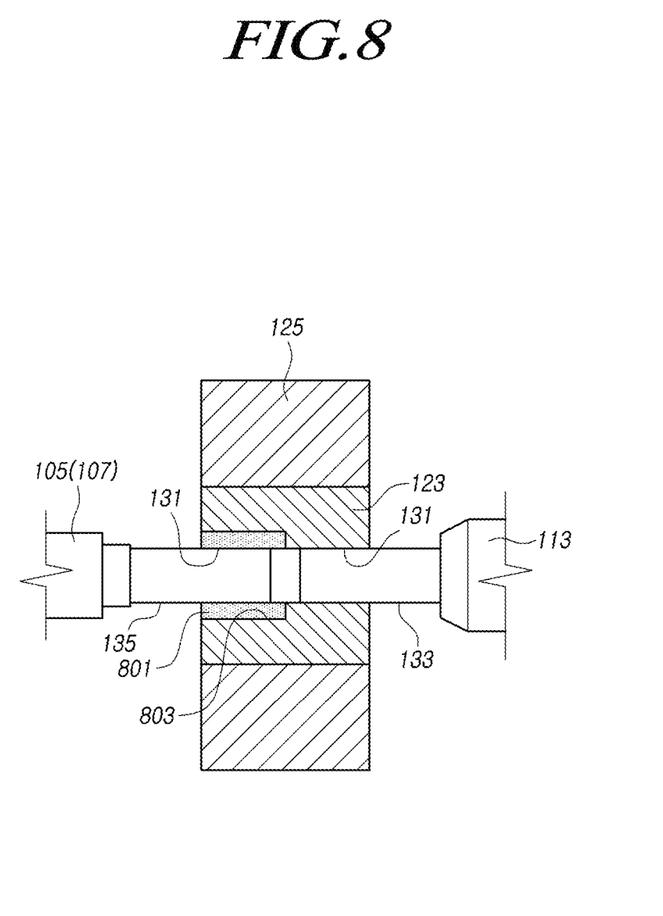
Figure 9:
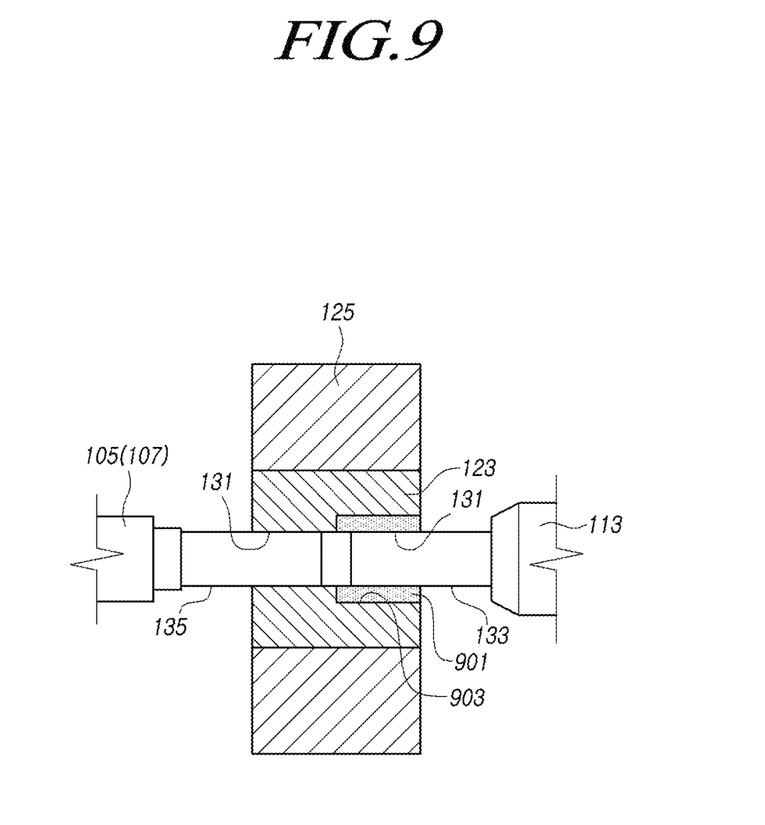

Alternatively, referring to FIGS. 8 and 9, a stepped portion 803 or 903 may be provided on one end portion or the other end portion of the connecting shaft 123, defined by an increase in the inner diameter of the connecting shaft 123. A damping member 801 or 901 may be provided on the stepped portion 803 or 903.

That is, the stepped portion 803 or 903 may be provided such that the inner diameter of the damping member 801 or 901 is the same as the inner diameter of the connecting shafts 123. Here, the first serration 131 may be provided on the inner circumferential surface of the connecting shafts 123 and the inner circumferential surface of the damping member 801 or 901.

The stepped portion 803 or 903 may be provided on one end portion or the other end portion of the connecting shaft 123, and the damping member 801 or 901 may be supported on the outer circumferential surface of the motor shaft 105 or 107 or the outer circumferential surface of the worm shaft 113.

Figure 10:
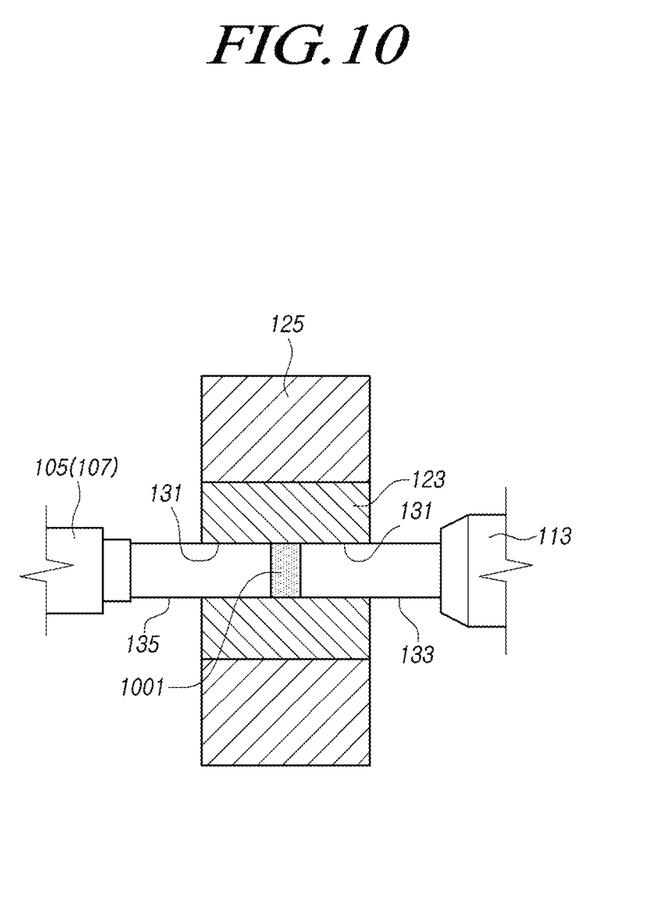

Next, referring to FIG. 10, a damping member 1001 may be provided on the central portion of the connecting shaft 123. In other words, the damping member 1001 may be provided between the motor shaft 105 or 107 of the first motor 101 or the second motor 103 and the worm shaft 113.

The damping member 1001, provided between the motor shaft 105 or 107 and the worm shaft 113, may reduce axial movement, thereby reducing noise.

Here, the damping member 901, provided in the central portion of the connecting shaft 123, may be press-fitted into the connecting shaft 123. For example, the diameter of the damping member 901 may be set to be greater than the inner diameter of the connecting shaft 123, such that the damping member 901 is press-fitted into the connecting shaft 123.

That is, when the connecting shaft 123 slides axially due to the actuator 125 being operated by the controller 201, the damping member 901 may be dislodged from the connecting shaft 123, thereby potentially causing a malfunction. However, since the damping member 901 is press-fitted into the connecting shaft 123, the damping member 901 may remain fitted into the connecting shaft 123 instead of being dislodged from the damping member 901 even when the connecting shaft 123 slides.

According to the electric assisted power steering apparatus having the above-described configuration, the worm shaft may be disconnected from any malfunctioning motor of motors connected to opposite end portions of the worm shaft, thereby preventing the worm shaft from rotating heavily or failing to rotate. Even in the case in which the worm shaft is disconnected from the malfunctioning motor, a target rotation speed of the properly-operating motor may be increased to prevent sudden changes in auxiliary torque occurring on the steering shaft, thereby promoting the safety of a driver. Torque required for the worm shaft may be distributed to the two motors, thereby increasing the rotation speeds of the motors and reducing the size and fabrication costs of the motors.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An electric assisted power steering apparatus comprising:
    a worm shaft engaging with a worm wheel;
    connecting members respectively including a connecting shaft and an actuator actuating the connecting shaft, wherein the connecting shafts of the connecting members are provided on opposite end portions of the worm shaft, one of the connecting shafts connects one end portion of the worm shaft and a motor shaft of a first motor, and another connecting shaft connects another end portion of the worm shaft and a motor shaft of a second motor; and
    a controller receiving information regarding motor rotation speeds from sensors detecting a rotation speed of the first motor and a rotation speed of the second motor, if a rotation speed of one motor of the first and second motors is different from a predetermined target rotation speed, determines the corresponding motor as malfunctioning, and controls the corresponding actuator to move the corresponding connecting shaft, thereby disconnecting the worm shaft from the malfunctioning motor.

2. The electric assisted power steering apparatus according to claim 1, wherein, if the worm shaft is disconnected from the malfunctioning motor, the controller increases the target rotation speed of the remaining motor of the first and second motors.

3. The electric assisted power steering apparatus according to claim 1, wherein the actuator includes a rod driving the connecting shaft.

4. The electric assisted power steering apparatus according to claim 3, wherein the rods is provided integrally with the connecting shaft.

5. The electric assisted power steering apparatus according to claim 3, wherein the rod is supported axially to the connecting shaft.

6. The electric assisted power steering apparatus according to claim 5, wherein a portion of the connecting shaft protrudes axially from the actuator,
    the protruding portion of the connecting shaft has a support extending radially to be supported on the rod.

7. The electric assisted power steering apparatus according to claim 1, wherein the connecting shaft has a hollow structure.

8. The electric assisted power steering apparatus according to claim 7, wherein the connecting shaft has a first serration provided on an inner circumferential surface thereof,
    the worm shaft has second serrations on the opposite end portions thereof, the second serrations engaging with the first serrations of the connecting shafts of the connecting members, and
    the motor shafts of the first and second motors have third serrations engaging with the first serrations.

9. The electric assisted power steering apparatus according to claim 8, wherein the actuator slides the connecting shaft axially.

10. The electric assisted power steering apparatus according to claim 9, wherein, if one of the first motor and the second motor malfunctions, the actuators slide the connecting shafts on the worm shaft toward the malfunctioning motor.

11. The electric assisted power steering apparatus according to claim 8, wherein the connecting member further includes a damping member provided inside of the connecting shaft.

12. The electric assisted power steering apparatus according to claim 11, wherein the damping member has a hollow structure to be supported on an inner circumferential surface of the connecting shaft.

13. The electric assisted power steering apparatus according to claim 12, wherein the first serration is provided on an inner circumferential surface of the damping member.

14. The electric assisted power steering apparatus according to claim 12, wherein the damping member extends from one end to another end of the connecting shaft.

15. The electric assisted power steering apparatus according to claim 12, wherein the connecting shaft has a stepped portion on one end portion or another end portion thereof, defined by an increase in an inner diameter of the connecting shaft, and the damping member is provided on the stepped portion.

16. The electric assisted power steering apparatus according to claim 11, wherein the damping member is provided between the motor shaft of the first motor or the second motor and the worm shaft.

* * * * *